United States Patent [19]
Haruki et al.

[11] Patent Number: 5,223,921
[45] Date of Patent: Jun. 29, 1993

[54] WHITE BALANCE ADJUSTING APPARATUS FOR AUTOMATICALLY ADJUSTING WHITE BALANCE ON THE BASIS OF A COLOR INFORMATION SIGNAL OBTAINED FROM AN IMAGE-SENSING DEVICE

[75] Inventors: Toshinobu Haruki, Shijonawate; Kikuchi Kenichi, Daito, both of Japan

[73] Assignee: Sanyo Electric Co., Ltd., Japan

[21] Appl. No.: 690,678

[22] Filed: Apr. 24, 1991

[30] Foreign Application Priority Data

| Apr. 27, 1990 | [JP] | Japan | 2-113126 |
| Jun. 20, 1990 | [JP] | Japan | 2-163274 |
| Feb. 19, 1991 | [JP] | Japan | 3-024721 |

[51] Int. Cl.$^5$ .......................................... H04N 9/73
[52] U.S. Cl. .......................................... 358/29; 358/44; 358/227
[58] Field of Search ............ 358/41, 44, 227, 209, 358/228, 27, 29, 315

[56] References Cited

U.S. PATENT DOCUMENTS

| 4,506,290 | 3/1985 | Hashimoto | 358/29 C |
| 4,595,946 | 6/1986 | Uehara et al. | 358/29 C |
| 4,700,219 | 10/1987 | Tanaka et al. | 358/29 C |
| 4,709,259 | 11/1987 | Suzuki | 358/48 |
| 4,725,881 | 2/1988 | Buchwald | 358/209 |
| 4,754,323 | 6/1988 | Kaji et al. | 358/29 C |
| 4,805,011 | 2/1989 | Sase | 358/29 C |
| 4,809,061 | 2/1989 | Suzuki | 358/75 |
| 4,887,252 | 12/1989 | Miyakawa et al. | 358/44 |
| 4,998,162 | 3/1991 | Kondo et al. | 358/29 C |
| 5,065,247 | 11/1991 | Haruki | 358/213.19 |
| 5,084,754 | 1/1992 | Tomitaka | . |
| 5,119,180 | 6/1992 | Okamoto | 358/209 |
| 5,126,832 | 6/1992 | Lee et al. | 358/22 |

FOREIGN PATENT DOCUMENTS

| 0356123 | 2/1990 | European Pat. Off. . |
| 400606A3 | 12/1990 | European Pat. Off. . |
| 52-52523 | 4/1977 | Japan . |
| 58-15381 | 1/1983 | Japan . |
| 62-35792 | 2/1987 | Japan . |
| 62-035792 | 2/1987 | Japan . |
| 62-132490 | 6/1987 | Japan . |
| 3-32174 | 2/1991 | Japan . |

Primary Examiner—Edward L. Coles, Sr.
Assistant Examiner—Kim Yen Vu
Attorney, Agent, or Firm—Peter L. Michaelson; Raymond R. Moser, Jr.

[57] ABSTRACT

Sixty four regions are established on an image-sensed picture from a video camera, wherein evaluating values $r_{ij}$, $b_{ij}$ and $y_{ij}$ are obtained by averaging color difference signals R-Y, B-Y and a luminance signal Y obtained from a video signal, respectively, over one field period for each region. When producing a gain control signal for each color difference signal, fuzzy inference is made on the basis of these evaluating values and a weighting amount for each color evaluating value for each region is determined. As a result of the weighting, the contribution degree of each color difference signal in a region, not including a light source color temperature axis on a color plane, is reduced to achieve good white balance adjustment.

15 Claims, 11 Drawing Sheets

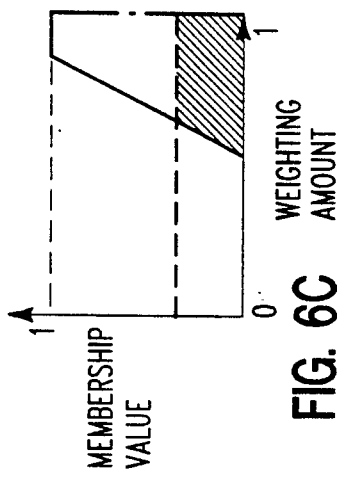
FIG. 6A
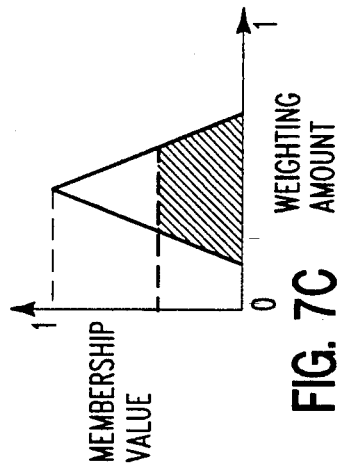
FIG. 6B
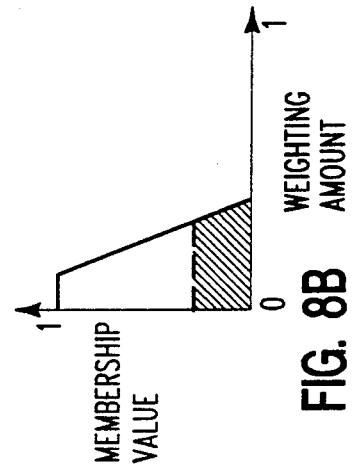
FIG. 6C
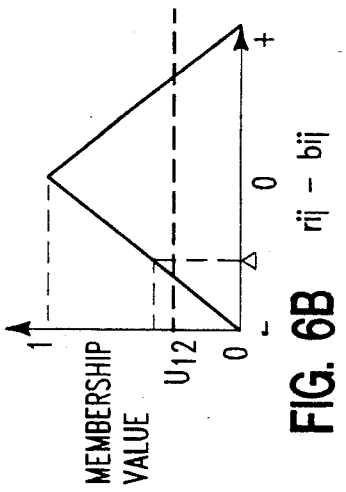
FIG. 7A
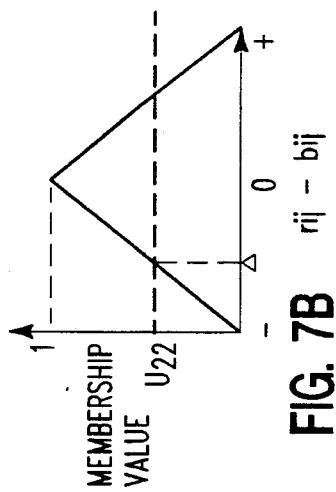
FIG. 7B
FIG. 7C
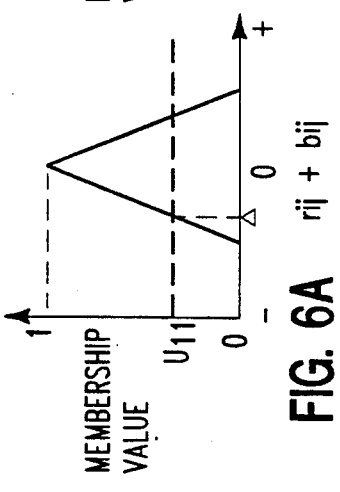
FIG. 8A
FIG. 8B FIG.9
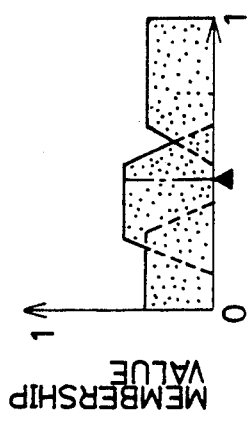
FIG.11
FIG.10
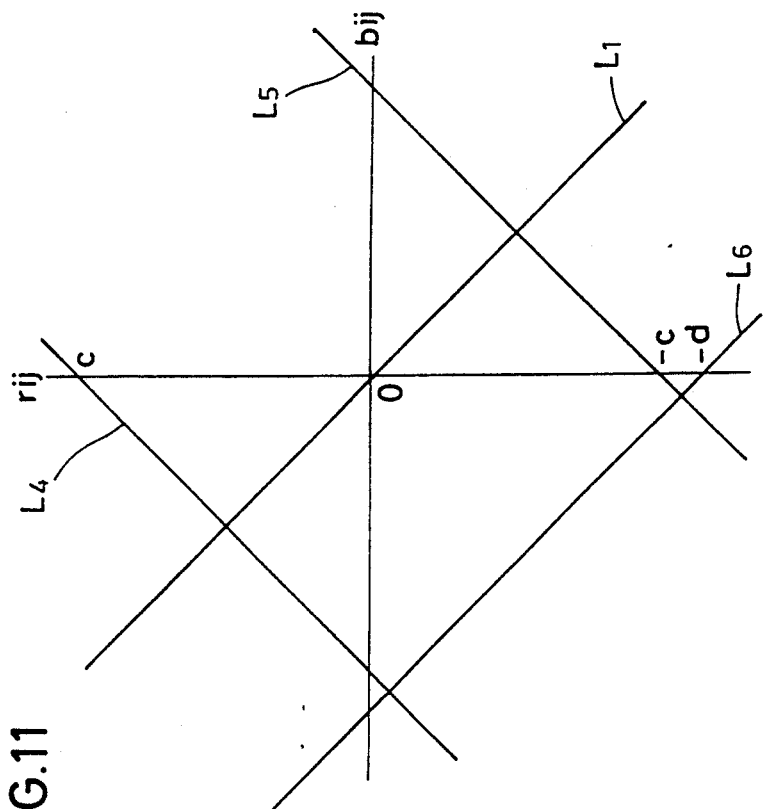
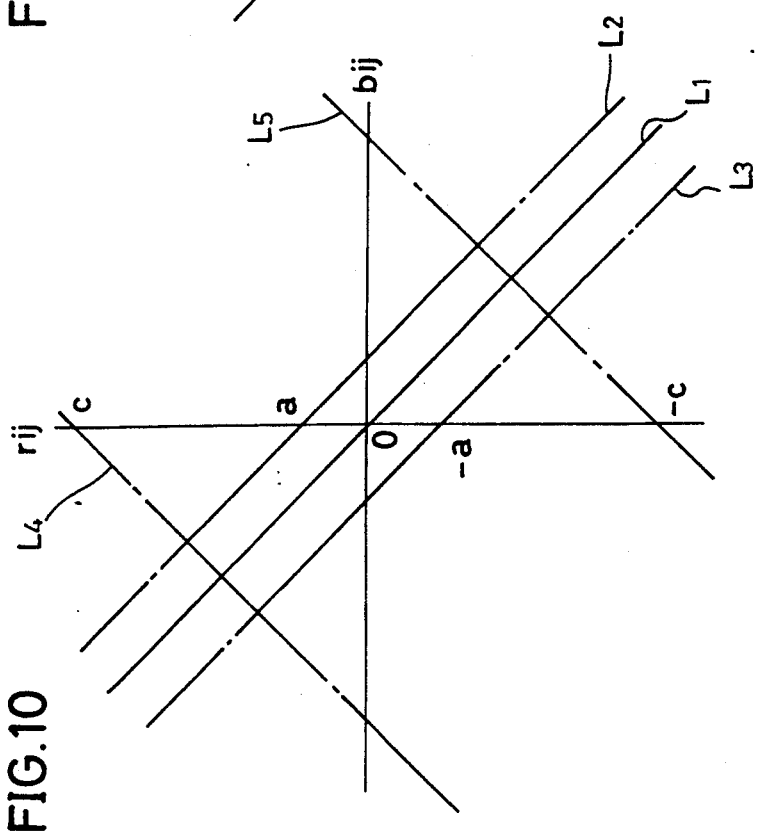

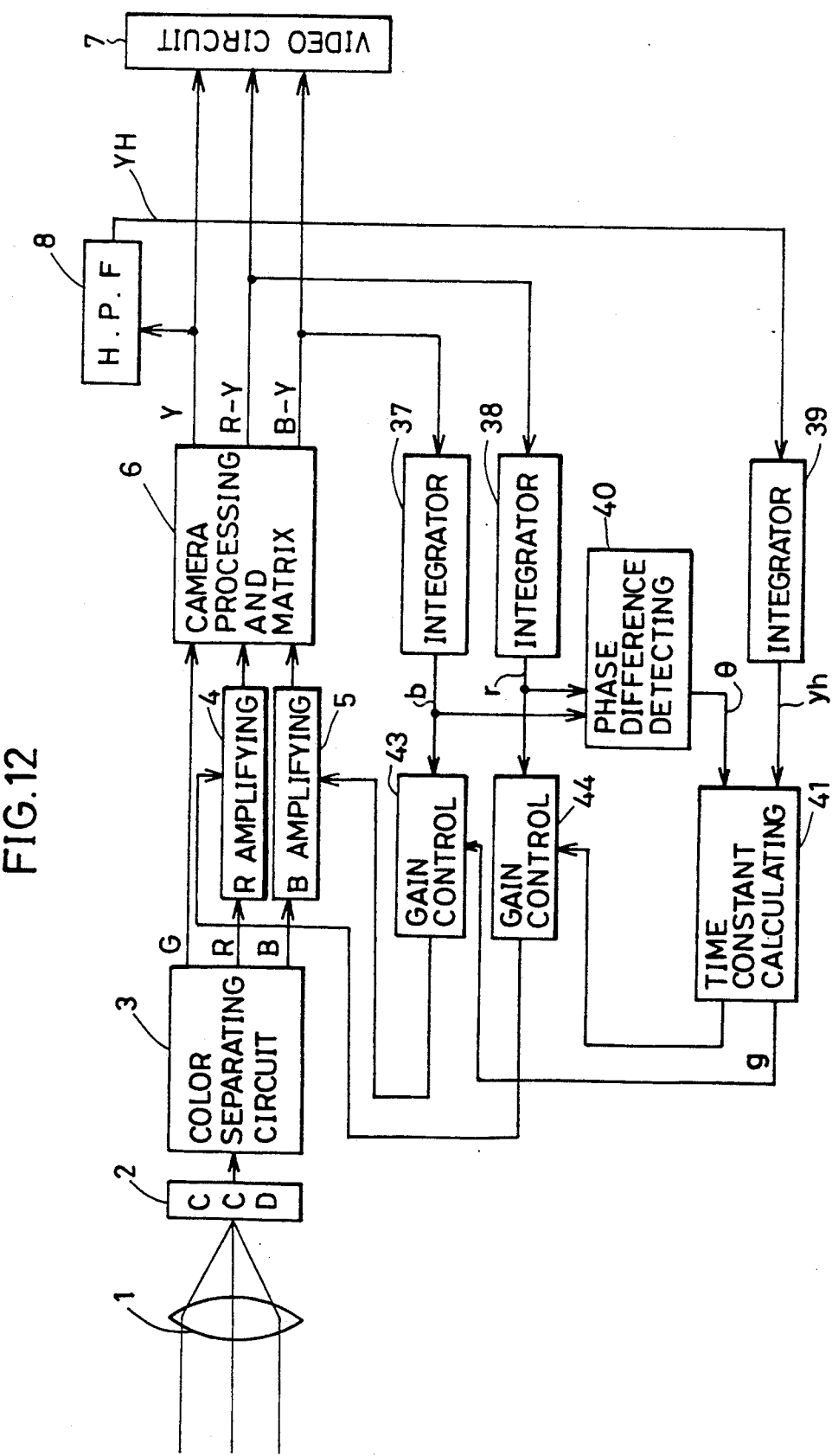

WHITE BALANCE ADJUSTING APPARATUS FOR AUTOMATICALLY ADJUSTING WHITE BALANCE ON THE BASIS OF A COLOR INFORMATION SIGNAL OBTAINED FROM AN IMAGE-SENSING DEVICE

BACKGROUND OF THE INVENTION

1. Field of the Invention

The present invention relates to white balance adjusting apparatus, and more particularly to a white balance adjusting apparatus in an image-sensing apparatus, such as a color video camera, for automatically adjusting white balance to correct the wavelenght distribution of light resulting from differing light sources. The correction is accomplished according to the color information signal within the image-sensing signal obtained from an image sensing device.

2. Description of the Background Art

In shooting an object using an image-sensing apparatus such as a color video camera, the wavelenght distribution of light illuminating the object from a light source differs by the type of the light source. For example, the blue components are intensive in light from a light source of relatively high temperature, whereas the red components are intensive in light from a light source of relatively low temperature. It is therefore necessary to correct the wavelength distribution of each light source in order to properly reproduce the color tone of the object. This correction is generally called white balance adjustment, where the gain of each color signal is adjusted so that the ratio of the amplitudes of the three primary color signals of red (hereinafter referred to as R), blue (hereinafter referred to as B), and green (hereinafter referred to as G) is 1:1:1 in shooting an achromatic object.

In conventional image sensing apparatus, the detection of the three primary color signals R, G and B is accomplished out according to light around the image sensing apparatus using a sensor provided for each color. However, white balance could not be adjusted correctly with such image sensing apparatus when the light source around the image sensing apparatus (for example, fluorescent light) differs from the light source illuminating the object (for example, the sun), as in the case where an outdoor scene is taken from inside a room.

Recently, a method called TTL (Through-The-Lens) is proposed in which white balance adjustment is carried out, without providing separated sensors, according to color difference signals R-Y and B-Y within the image sensing signal obtained from an image sensing device. Such a method is disclosed in Japanese Patent Laying-Open No. 62-35792, for example. This method is based on consideration that the object taken by an image sensing apparatus has various color area distribution (hereinafter referred to as the color distribution) and if this color distribution is averaged over a sufficient long time, the color components cancel each other to result in each color signal becoming "0", which is equivalent to a state of taking a completely white picture. According to this method, by controlling the magnitude of respective color signals so that the values resulting from integration of color difference signals R-Y and B-Y over one field period, for example, become 0. Consequently, the deviation of the color tone due to wavelength distribution of light of the light source can be corrected.

FIG. 1 is a block diagram showing an example of a conventional white balance adjusting apparatus using the TTL method. Referring to FIG. 1, light from an object (not shown) enters an image sensing device 2 formed of a CCD via a lens 1. The incident light is photoelectrically into an electric signal by the image-sensing device 2 and provided to a color separating circuit 3. Color separating circuit 3 extracts the three primary color signals of R, G and B from this electric signal. The extracted G signal is directly provided to a camera processing and matrix circuit 6. The extracted R signal and B signal are provided to camera processing and matrix circuit 6 via a gain variable R amplifying circuit 4 and a B amplifying circuit 5, respectively. Camera processing and matrix circuit 6 produces a luminance signal Y and color difference signals R-Y and B-Y according to the entered three primary color signals of G, R and B. The outputs are provided to a video circuit 7 where luminance signal Y and color difference signals R-Y and B-Y are subjected to the well-known process to produce a recordable video signal. This recordable video signal is provided to a video recording circuit not shown.

The two color difference signals R-Y and B-Y are applied to integrating circuits 18 and 17, respectively, to be integrated over a sufficient long time, for example over 1 field period of a video signal. The values resulting from integration are provided to gain control circuits 13 and 14. Gain control circuits 13 and 14 control the variable gains of B amplifying circuit 5 and R amplifying circuit 4 so that each value resulting from integration becomes 0. This results in the amplitude ratio for 1:1:1 of the three primary color signals G, R and B and adjustable white balance.

The conventional white balance adjusting apparatus of FIG. 1 corrects the irregularity of the wavelength distribution due to light of the light source, based on the consideration that colors cancel each other so that the reproduced picture can approximate a substantially white picture if the various color distributions of the object itself are averaged over a long period. A disadvantage of this method is that proper white balance regarding the object itself could not be achieved because the reproduced picture could not approximate a white picture even if the color distributions of the object included in the entire picture were averaged. This problem arises when the area ratio of the three primary colors within the picture is not equal, that is to say, when the color distribution is not equal, such as in the case where green lawn or a blue sky occupies a large area of the picture, or in the case where a human object wearing a red sweater is taken in a close-up manner. If the above mentioned white balance adjustment is applied to such an unbalanced state of white balance, the gain will be controlled so as to cancel the most intensive color in the image. In the case of a close-up of a person wearing a red sweater, white balance will be intense in blue, resulting in a problem that the color of the object itself cannot be properly reproduced on the screen.

This problem is described theoretically hereinafter. FIG. 2 is a graph showing the changes of two color difference signals R-Y and B-Y obtained in the case where a light of the light source illuminates a white color object or an object including each color on average as the color temperature of the light source changes. The ordinate indicates the red color difference signal R-Y whereas the abscissa indicates the blue color difference signal B-Y. As the color temperature of the light source changes, the color information of the screen, i.e., the obtained color difference signals vary only within a distribution range in the vicinity of a fixed locus (called the light source color temperature axis) crossing the origin, i.e. the white region, as shown in FIG. 2.

In ordinary image sensing situations, there are many cases where an object of chromatic colors having color information not in the distribution range occupies a large area of the picture. The obtained color information not within the distribution range, i.e. the color difference signals out of phase from the light source color temperature axis do not reflect the light source color temperature and are not appropriate as the color information for white balance adjustment. It is desirable that these color difference signals not be considered when the white balance is adjusted.

The light source color temperature axis crosses the origin (white color), as shown in FIG. 2, where the color difference signal of red is reduced as the color difference signal of blue increases (the fourth quadrant), and the color difference signal of red increases as the color difference signal of blue is reduced (the second quadrant). The first and third quadrants, not including the light source color temperature axis, do not reflect the light source color temperature and, therefore, are not adequate as the fundamental sources of information useful in the white balance adjustment. This means that when an object having significantly high chroma is included in the picture, the color distribution average of the entire picture does not show an achromatic color due to the effect of high chroma. The unnecessary white balance adjustment causes the white balance to be intense in the complementary color side of the high chroma color. Thus, the color of the object itself cannot be properly reproduced.

For example, as the case of image-sensing an object with high chroma, the situation in which a green portion such as lawn and plants occupying a large area on a screen is likely to occur. When the color distribution of an object is biased to green like this, both of the obtained color difference signals R-Y, B-Y become negative values, which are included in the third quadrant of FIG. 2. That is to say, such color signals have large phase difference from the light source color temperature axis and do not reflect the color temperature of the light source. Accordingly, such color difference signals should not be considered in the white balance adjustment.

In order to deal with such conditions, various methods have been introduced for removing the effect of large portions of an image being one color on the white balance adjustment. Typically, the methods operate by avoiding supplying to integrators 17 and 18, in the circuit of FIG. 1, color information from portions of the screen that include colors in the above described first and third quadrants or portions of the screen in which the luminance level exceeds a predetermined value.

When the image-sensed screen does not include all the respective colors on the average and, therefore, is not adequate for performing the white balance adjustment as a whole, it is necessary to avoid white balance adjustment on the basis of the color difference signals obtained from the entirety of the screen.

In such cases, it is required to determine whether various image information, including luminance level satisfy predetermined conditions in a select region of the screen. Consequently, either white balance adjustment is accomplished on the basis of the color information in the region selected or white balance adjustment is avoided on the basis of the color information obtained from the entirety of the screen.

However, when it is determined, in an alternative manner, whether various image information satisfy various conditions as described above, the effect upon the evaluation of the entirety of the picture exerted by a small change of the object in the vicinity of the region boundaries of respective conditions is large, so that the image reproduced on the monitor screen becomes unstable. In order to avoid such unstability, it is desirable to accomplish the regional processing by sub-dividing the various conditions into a set of intermediate conditions. However, processing with such an intermediate condition set is very difficult to be implemented in the aspect of the system capacity and processing ability of the system.

SUMMARY OF THE INVENTION

It is an object of the percent invention to provide a white balance adjusting apparatus capable of white balance adjustment with high accuracy and high stability with simple structure.

It is another object of the present invention to provide a white balance adjusting apparatus capable of appropriate white balance adjustment without setting detailed conditions for white balance adjustment for various image sensing conditions.

It is yet another object of the present invention to provide a white balance adjusting apparatus capable of appropriate automatic white balance adjustment even when the color distribution of an object is not uniform.

It is still another object of the present invention to provide a white balance adjusting apparatus capable of appropriate automatic white balance adjustment even when an object having color information out of the distribution range of color information associated with light source color temperature variation occupies a large area on a screen.

Briefly stated, the present invention is a white balance adjusting apparatus for automatically carrying out the white balance adjustment on the basis of a video signal obtained from an image-sensing device. The invention includes amplifying circuits, a picture evaluating circuit and gain control circuits. The amplifying circuits amplify respective ones of a plurality of color information signals in a video signal with variable gains. The picture evaluating circuit determines representative values indicating color information of the entirety of an image-sensed picture on the basis of the color information signals. The gain control circuits control the variable gains of the amplifying circuits on the basis of the representative values. The determination of the representative values is made using a fuzzy inference.

In accordance with another aspect of the present invention, a white balance adjusting apparatus includes amplifying circuits, integrating circuits, and gain control circuits. The amplifying circuits amplify respective ones of a plurality of color information signals in a video signal with variable gains. The integrating circuits determine representative values indicating color information of the entirety of an image-sensed picture on the basis of the color information signals. The gain control circuits control the variable gains of the amplifying circuits on the basis of the representative values.

The magnitude of each color information signal is determined by the gain control circuit and is controlled using the fuzzy inference.

In accordance with still another aspect of the present invention, a white balance adjusting apparatus includes amplifying circuits, gain control circuits, a phase difference detecting circuit and a time constant determining circuit. The amplifying circuits amplify respective ones of a plurality of color information signals in a video signal with variable gains. The gain control circuits control the variable gains of the amplifying circuits on the basis of the color information signals. The phase difference detecting circuit detects phase difference between a predetermined light source color temperature axis and color information signals. The time constant determining circuit determines a time constant of the gain control by the gain control circuit on the basis of the detected phase difference.

In accordance with yet another aspect of the present invention, a white balance adjusting apparatus includes amplifying circuits, gain control circuits, a contrast evaluating value detecting circuit and a time constant determining circuit. The amplifying circuits amplify respective ones of a plurality of color information signals in a video signal with variable gains. The gain control circuits control the variable gains of the amplifying circuits on the basis of a color information signal. The contrast evaluating value detecting circuit detects a high frequency component level of a luminance signal in the video signal as a contrast evaluating value. The time constant determining circuit determines a time constant of the gain control by the gain control circuit on the basis of the detected contrast evaluating value.

Accordingly, it is a main advantage of the present invention that it can implement stable white balance adjustment without setting detailed conditions corresponding to various image-sensing conditions, since color information representative of the entirety of the picture are determined by performing the fuzzy inference based on some predetermined rules for adjusting white balance.

It is another advantage of the present invention that it can carry out good white balance adjustment even when an object with color tone not suitable to white balance adjustment is image-sensed, since a determination is made as to whether or not the image-sensed picture is appropriate as an object of white balance adjustment by the fuzzy inference with input variables of phase difference between a light source color temperature axis and color information signals and/or a contrast evaluating value.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6(a)-6(c) are graphs showing a membership function of the rule 1 of the first embodiment of the present invention.

FIGS. 7(a)-7(c) are graphs showing a membership function of the rule 2 of the first embodiment of the present invention.

FIGS. 8(a)-8(b) are graphs showing a membership function of the rule 3 of the first embodiment of the present invention.

FIGS. 9, 10 and 11 are graphs for describing operation principle of the first embodiment of the present invention.

FIG. 12 is a block diagram showing a white balance adjusting apparatus in accordance with the second embodiment of the present invention.

DESCRIPTION OF THE PREFERRED EMBODIMENTS

Figure 3:
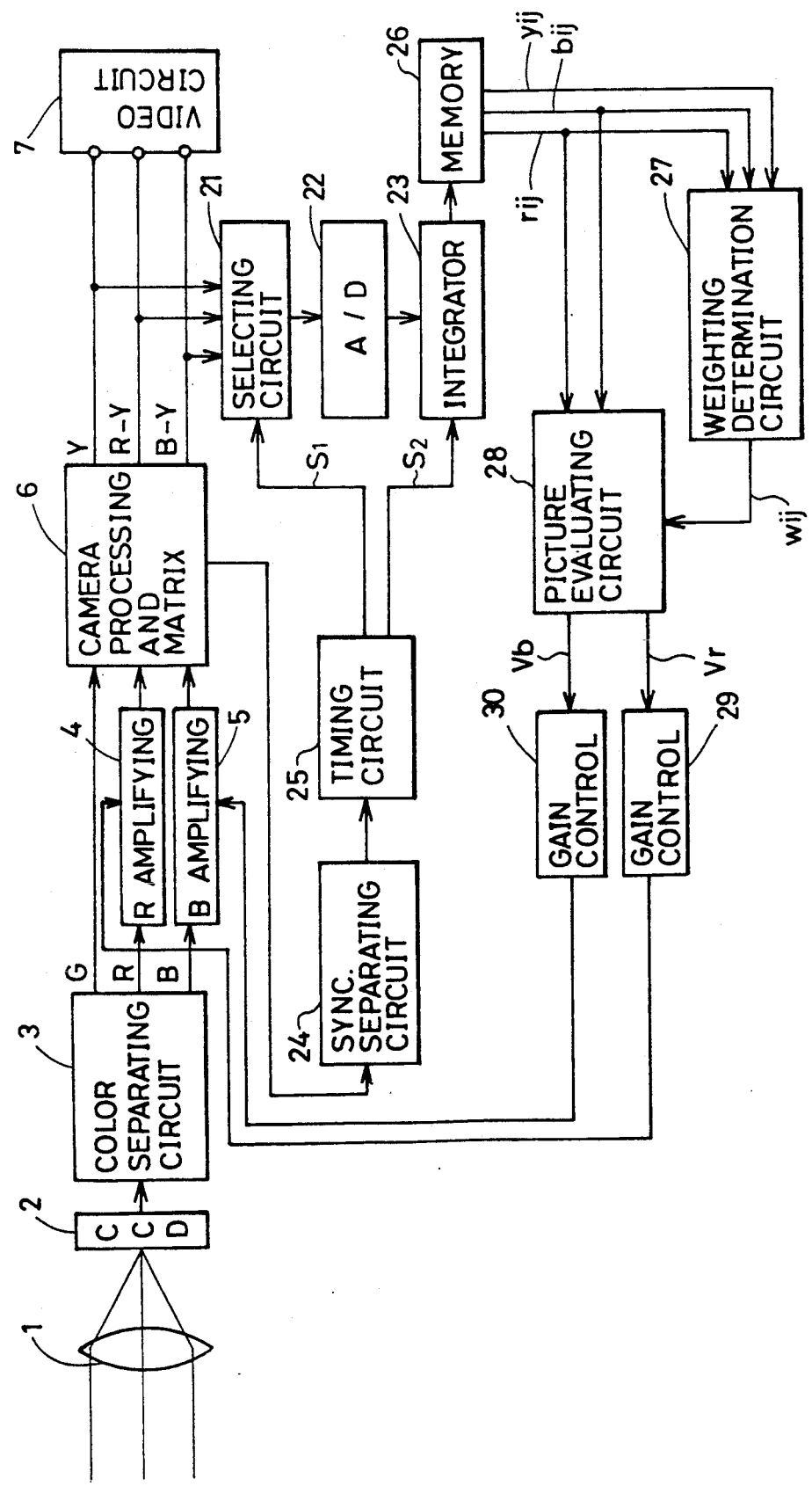
FIG. 3 is a block diagram showing a white balance adjusting apparatus according to the first embodiment of the present invention.

FIG. 3 is a block diagram showing a white balance adjusting apparatus of a first embodiment of the present invention. Referring to FIG. 3, light from an object (not shown) enters, via a lens 1, an image sensing device 2 formed of a charge coupled device (CCD). The incident light is photoelectrically converted into an electric signal by image-sensing device 2. The resultant electric signal is applied to a color separating circuit 3. Color separating circuit 3 extracts three primary color signals of R, G and B from the applied electric signal. The extracted G signal is directly provided to a camera processing and matrix circuit 6, while signals R and B are provided to camera processing and matrix circuit 6 via an R amplifying circuit 4 and a B amplifying circuit 5 with variable gains, respectively. Camera processing and matrix circuit 6 produces luminance signal Y and color difference signals R-Y and B-Y based on the applied three primary color signals of G, R and B, and provides the outputs to a video circuit 7. Well-known processes are applied to signals Y, R-Y and B-Y in video circuit 7 to produce a recordable video signal. This recordable video signal is provided to a recording circuit not shown.

Simultaneously, each of signals Y, R-Y and B-Y is provided to a selecting circuit 21. Selecting circuit 21 is responsive to a selection signal S1 produced by a timing circuit 25 based on a vertical synchronizing signal provided from a synchronizing separating circuit 24, to sequentially select one signal out of luminance signal Y, color difference signal R-Y and color difference signal B-Y for each 1 field. In the embodiment of FIG. 3 for example, the luminance signal or the color difference signal is selected for each field in the order of (Y)→(R-Y)→(B-Y)→(Y)→(R-Y)→ . . . . The selected signal is provided to an A/D converter 22 of the succeeding stage.

A/D converter 22 samples one of signals Y, R-Y and B-Y, selected by selecting circuit 21, with a predetermined sampling period to convert the selected signal into a digital value. The converted value is provided to an integrator 23.

Meanwhile, timing circuit 25 produces a switching signal S2 based on vertical and horizontal synchronizing signals provided from camera processing and matrix circuit 6 and a fixed output of an oscillator (not shown) for driving CCD 2. Switching signal S2 is provided to integrator 23. Integrator 23 is responsive to switching signal S2 to divide the image-sensed picture into $8 \times 8 = 64$ rectangular regions $A_{11}, A_{12}, A_{13}, \ldots, A_{ij}$ (i, j=integer of 1–8) each of an identical area, for deriving the output of selecting circuit 21 in a time divisional manner for each region.

More specifically, integrator 23 receives switching signal S2 to add the A/D converted values of output from selecting circuit 21 over 1 field period for each region, i.e., digitally integrates the output of selecting circuit 21 for each of the 64 regions. After integration over 1 field period is completed, the digitally integrates value 91e stored in memory 26 corresponding to each region as a luminance evaluating values or a color evaluating value. The digitally integrates values of luminance signal Y corresponding to respective ones of the 64 regions are obtained as 64 luminance evaluating values $y_{ij}$ (i,j:1–8) in an arbitrary field. In the next field where color difference signal R-Y is selected by selecting circuit 21, the digitally integrates values for respective regions of color difference signal R-Y are obtained as 64 color evaluating values $r_{ij}$ as result of integration for respective regions by integrator 23. At a further next field where color difference signal B-Y is selected by selecting circuit 21, the digitally integrates values for respective regions of color difference signal B-Y are obtained as 64 color evaluating values $b_{ij}$ as a result of integration for respective regions by integrator 23.

When integration of luminance signal Y, and color difference signals R-Y and B-Y over 3 field periods is completed, a total $64 \times 3 = 192$ of luminance evaluating values $y_{ij}$ and color evaluating values $r_{ij}$ and $b_{ij}$ are held in memory 26. Similar operation is repeated where a new luminance evaluating value $y_{ij}$ is applied to memory 26 at the next field. At a further next field, color evaluating value $r_{ij}$ is applied to memory 26. The luminance evaluating value and color evaluating values held in memory 26 are sequentially updated.

Figure 5:
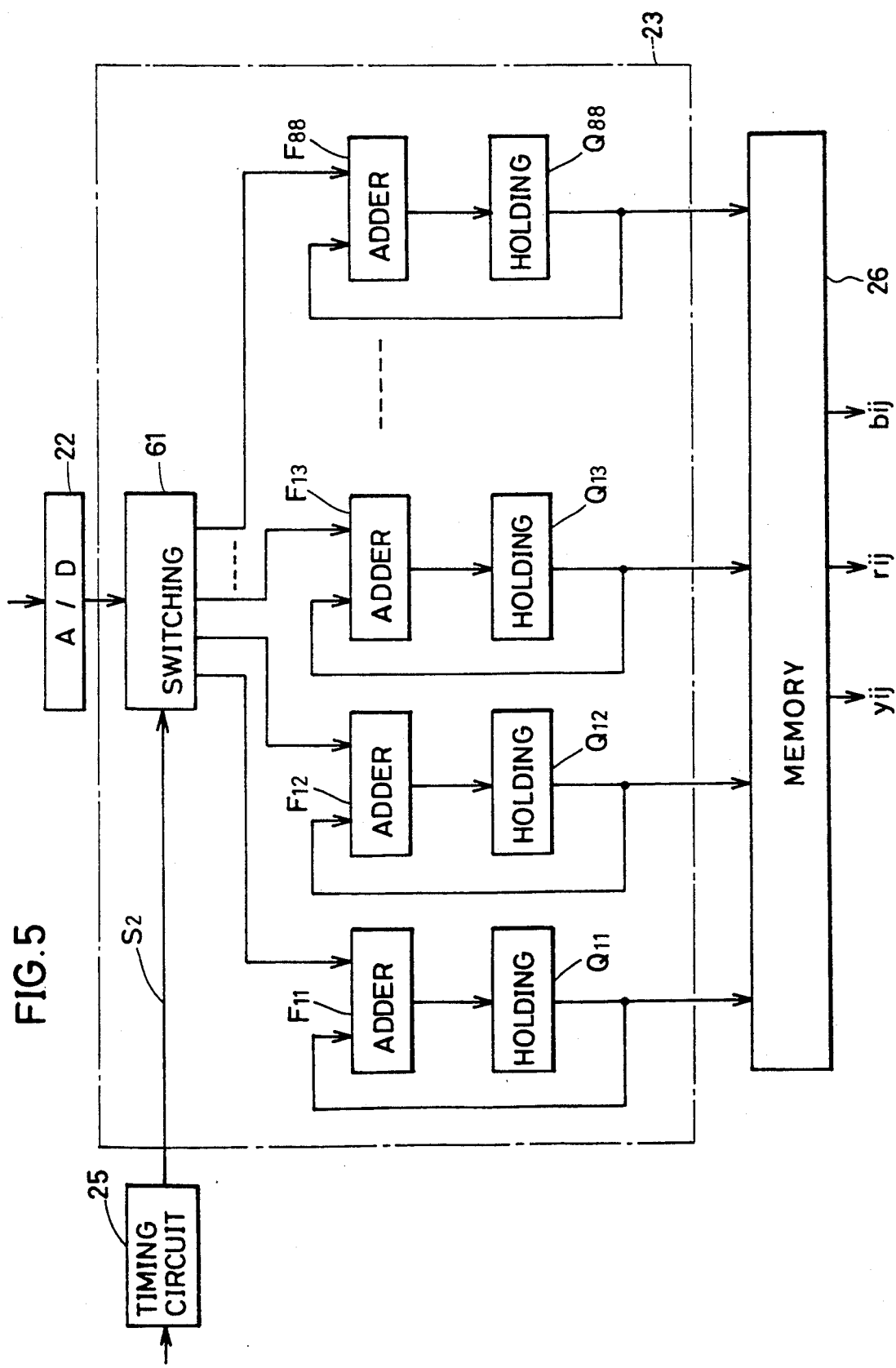
FIG. 5 is a block diagram showing details of an integrator of FIG. 3.

FIG. 5 is a block diagram showing integrator 23 in detail. Each A/D converted data provided from A/D converter 22 is provided to a switching circuit 61. Switching circuit 61 receives switching signal S2 from timing circuit 25 for providing each A/D converted value into an adder provided corresponding to the region where the sampling point of the corresponding A/D converted data exists, out of the 64 adders $F_{11}$, $F_{12}, \ldots, F_{88}$ provided corresponding to the 64 regions $A_{11}, A_{12}, \ldots, A_{88}$. For example, if a sampling point of an arbitrary A/D converted data is included in region $A_{11}$, switching circuit 61 provides this data to adder $F_{11}$ corresponding to region $A_{11}$.

In the succeeding stage of each adder $F_{ij}$, a holding circuit $Q_{ij}$ is correspondingly provided, where the output of each adder is temporarily held in the corresponding holding circuit. The data held in each holding circuit is applied to the corresponding adder again and added to the next applied A/D converted data. Each holding circuit $Q_{ij}$ is reset by each 1 field in response to a vertical synchronizing signal, and only the data held immediately before the reset is provided to memory 26. Thus, one digital integrating circuit is formed by one set of an adder and a holding circuit, and integrator 23 is formed by a total of 64 digital integrating circuits. This means that digital-integrated values corresponding to respective ones of 64 regions are applied to memory 26 from respective holding circuits for each field.

Figure 2:
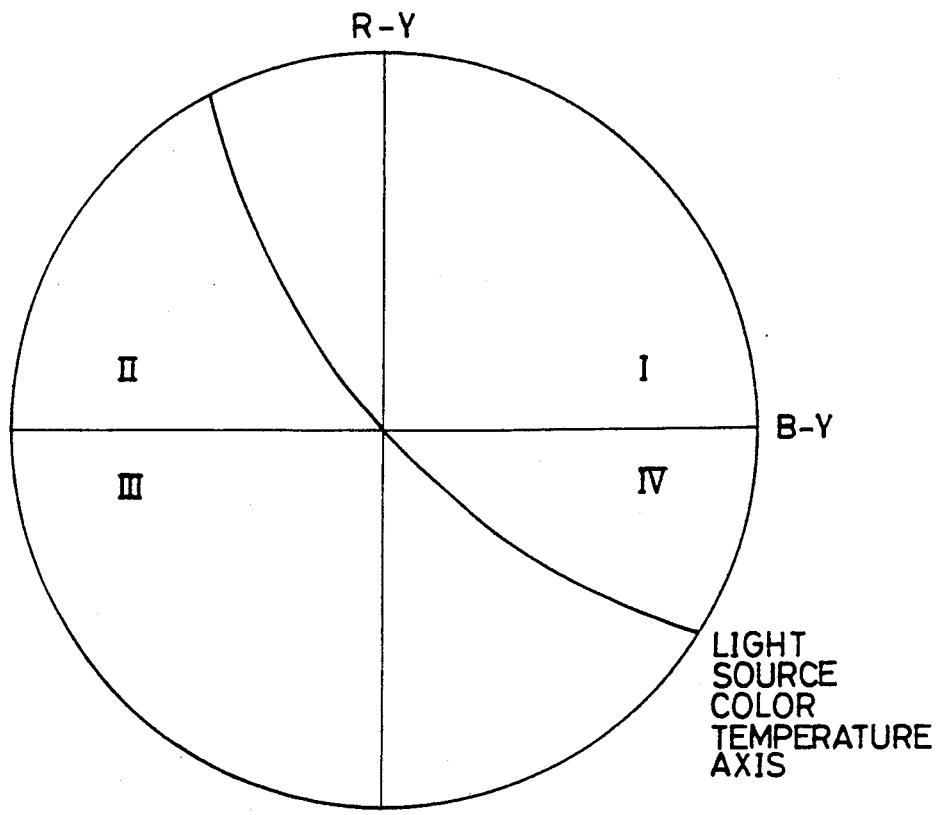
FIG. 2 is a graph showing color information obtained according to a change in light source color temperature.
Figure 4:
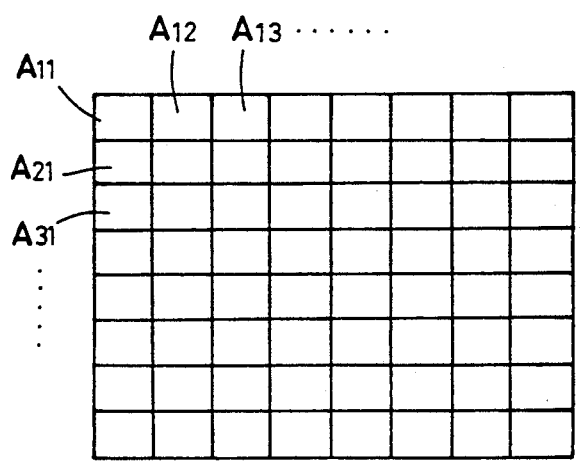
FIG. 4 is a diagram schematically showing area setting on an image sensing screen.

The reference level, i.e. the 0 level, of each of the two color difference signals R-Y and B-Y provided to A/D converter 22 is set in advance to a level obtained when a complete achromatic color picture is taken. Therefore, the value obtained by A/D converting each of the color difference signals may take not only a positive value, but a negative value, as shown in FIG. 2.

Returning again to FIG. 3, the latest evaluating values $y_{ij}$, $r_{ij}$, and $b_{ij}$ calculated as described above and held in memory 26 are provided to a weighting determination circuit 27. The weighting determination circuit 27 determines a weighting amount for each region in color evaluation of the entirety of the picture on the basis of these evaluating values.

The fuzzy inference is employed in the weighting amount determining process by weighting determination circuit 27, in which information with fuzzy boundary is processed as it is. In the fuzzy inference, the following rules are used for each region.

Rule 1

"If $r_{ij}+b_{ij}$ is considerably close to 0 and $r_{ij}-b_{ij}$ is close to 0, then the weighting amount is made large."

Rule 2

"If $r_{ij}+b_{ij}$ is negative to a small extent and $r_{ij}-b_{ij}$ is close to 0, then the weighting amount is made somewhat small."

Rule 3

"If $y_{ij}$ is considerably large, then the weighting amount is made considerably small."

In these rules, as shown in FIGS. 6 through 8, conditions and conclusions such as "close", "large" are defined by membership functions for respective input variables of "$r_{ij}+b_{ij}$", "$r_{ij}-b_{ij}$", "$y_{ij}$" and an output variable of "weighting amount".

Next, each of the above-described rules will be described in detail.

Rule 1 is defined by such membership functions as shown in FIGS. 6(a), (b) and (c). FIG. 6(a) is a graph for obtaining a membership value indicating the degree of satisfaction of the first condition of the rule 1 of "$r_{ij}+b_{ij}$ is considerably close to 0", which indicates a membership function for a sum of both of color evaluating values $r_{ij}$ and $b_{ij}$ in each region as an input variable. That is to say, the membership function of FIG. 6(a) is a function having a mountain-like shape with its maximum value "1" when the sum of both the evaluating values is 0. The shape of the function is set to form relatively steep gradient of the mountain in order to satisfy the condition of "considerably". By substituting the sum $r_{ij}+b_{ij}$ of both the latest color evaluating values of each region into the function shown in FIG. 6(a), a membership value $u_{11}$ is obtained.

FIG. 6(b) is a graph for obtaining a membership value indicating the degree of satisfaction of the second condition of rule 1 of "$r_{ij}-b_{ij}$ is close to 0", which indicates a membership function for a subtraction value obtained by subtracting color evaluating value $b_{ij}$ from color evaluating value $r_{ij}$ in each region as an input variable. That is to say, the membership function of FIG. 6(b) is a function having a mountain-like shape with its maximum value "1" when the above-described subtraction value is 0, and a membership value $u_{12}$ is obtained by substituting the above subtraction value into this function.

FIG. 6(c) is a graph showing a conclusion of "the weighting amount is made large", which indicates a membership function for a weighting amount in each region as an output variable of rule 1. The membership function of FIG. 6(c) is a function including a simple increasing straight line, in which a smaller value among membership values $u_{11}$, $u_{12}$ of the first and second conditions of the rule 1 is specified on the ordinate indicating membership value. The region indicated by the membership function of FIG. 6(c) is divided into two areas by a line corresponding to the specified membership value. The region indicated by oblique lines which does not exceed the membership value corresponds to an inference result obtained by applying actually calculated evaluating values to the rule 1.

For example, when a sum $r_{ij}+b_{ij}$ and a difference $r_{ij}-b_{ij}$ of both color evaluating values in a certain region are equal to values indicated by $\Delta$ in FIG. 6(a) and (b), respectively, the relationship of $u_{11}<u_{12}$ holds between obtained memberships functions, and $u_{11}$ is specified on the ordinate of FIG. 6(c) Then, with a boundary of the line corresponding to the value $u_{11}$, the upper portion of the region indicated by the membership function is deleted, and the center of point of the remaining oblique line region corresponds to a weighting amount corresponding to the degree of satisfaction of rule 1.

Rule 2 is defined by such membership functions as shown in FIGS. 7(a), (b) and (c). FIG. 7(a) is a graph for obtaining a membership value indicating the degree of satisfaction of the first condition of the rule 2 of "$r_{ij}+b_{ij}$ is negative to a small extent", which indicates a membership function for a sum of both color evaluating values $r_{ij}$ and $b_{ij}$ in each region as an input variable. That is to say, the membership function of FIG. 7(a) is a function having a mountain-like shape with its maximum value "1" when the sum of both color evaluating values is somewhat smaller than 0, and a membership value $u_{21}$ is obtained by substituting a sum $r_{ij}+b_{ij}$ of the latest both color evaluating values in each region into the function.

FIG. 7(b) is a graph for obtaining a membership value indicating the degree of satisfaction of the second condition of the rule 2 of "$r_{ij}-b_{ij}$ is close to 0", which is the same function as the function of the second condition of rule 1 of FIG. 6(b). By substituting the above-mentioned subtraction value into this function, a membership value $u_{22}$ is obtained.

FIG. 7(c) is a graph showing a conclusion that "the weight amount is made small to some extent", which shows a membership function for a weighting amount in each region as an output variable of rule 2. The membership function of FIG. 7(c) is a function having a mountain-like shape with its maximum value "1" in the vicinity of the weighting amount of 0.25, in which a smaller value of membership values $u_{21}$, $u_{22}$ of the first and second conditions of rule 2 is specified on the ordinate indicating membership value. The region indicated by the membership function of FIG. 7(c) is divided into two regions by a line corresponding to the specified membership value. The region indicated by oblique lines which does not exceed the membership value corresponds to an inference result obtained by applying an actually calculated evaluating value to rule 2.

For example, if a sum $r_{ij}+b_{ij}$ and a difference $r_{ij}-b_{ij}$ of both color evaluating values in a certain region are equal to the values indicated by $\Delta$ in FIGS. 7(a) and (b), respectively, the relationship of $u_{21}>u_{22}$ holds between the obtained membership values, and $u_{22}$ is specified on the ordinate of FIG. 7(c). Then, with a boundary at the $u_{22}$, the upper portion of the region indicated by the membership function is deleted, and the center point of the remaining oblique line region corresponds to a weighting amount indicative of the degree of satisfaction of rule 2.

Rule 3 is defined by such membership functions as shown in FIGS. 8(a) and (b). FIG. 8(a) is a graph for obtaining a membership value indicating the degree of satisfaction of the first condition of rule 3 of "$y_{ij}$ is considerably large", which indicates a membership function for luminance evaluating value $y_{ij}$ in each region as an input variable. The membership function shown in FIG. 8(a) is a function including a simple increasing straight line, in which a membership value $u_{31}$ is obtained by substituting the latest luminance evaluating value in each region into this function.

FIG. 8(b) is a graph showing a conclusion that "the weighting amount is made considerably small", which indicates a membership function for a weighting amount in each region as an output variable of rule 3. The membership function shown in FIG. 8(b) is a function including a simple decreasing straight line, in which a membership value $u_{31}$ of the first condition of rule 3 is specified on the ordinate indicating membership value. The region indicated by the membership function of FIG. 8(b) is divided into two regions by a line corresponding to the specified membership value $u_{31}$. The region indicated by oblique lines which does not exceed the membership value corresponds to an inference result obtained by applying an actually calculated luminance evaluating value to rule 3.

For example, if a luminance evaluating value in a certain region is a value shown by $\Delta$ in FIG. 8(a), $u_{31}$ is specified on the ordinate of FIG. 8(b). Then, as shown in FIG. 8(b), with a boundary of the $u_{31}$, the upper portion of the region shown by the membership function is deleted and the center point of the remaining oblique line region indicative of a weighting amount corresponding to a degree of satisfaction of rule 3.

Next, a method for determining weighting amounts in respective regions in consideration of all of the above-described rules 1 through 3 will be described. The respective quadrangles indicated by oblique lines in FIGS. 6(c), 7(c) and 8(b) are superimposed on coordinate systems common with these figures, that is, coordinate systems in which weighting amounts are indicated on the abscissa and membership values are indicated on the ordinate, and the function of FIG. 9 obtained as the result corresponds to the membership function indicating the final inference result. The position of the center point of the region indicated by this function is a weighting amount $w_{ij}$ in the region determined in consideration of all the conditions of rules 1 through 3.

Instead of the above-described method of determining weighting amounts with the center point positions, a position on an abscissa at which an area of a portion surrounded by the membership function in FIG. 9 is equally divided into left and right sides can be introduced as a weighting amount of that region.

Next, the effect exerted by the above respective rules upon the white balance adjusting operation will be described. As described above, when the color temperature of a light source in radiating a white object changes, two color difference signals R-Y and B-Y obtained from the entirety of the picture change according to the light source color temperature axis shown in FIG. 2. Accordingly, color difference signals included in the first and third quadrants, not including the light source color temperature axis, hardly reflect the color temperature of the light source. These color signals are not preferably considered as basic information when performing white balance adjustment.

In a coordinate system in which color evaluating value $b_{ij}$ of a color difference signal B-Y for each region is indicated on an abscissa (X axis) and a color evaluating value $r_{ij}$ of a color difference signal R-Y for each region is indicated on an ordinate (Y axis), the light source color temperature axis shown in FIG. 2 can be approximately expressed as a straight line with a slope of $-1$ ($r_{ij} = -b_{ij}$) as shown by the straight line L1 of FIGS. 10 and 11.

In accordance with Rule 1, when a color evaluating value calculated for each region is shifted from an origin in the direction orthogonal to the light source color temperature axis L1, even if the amount of shift is very small, the amount of weighting in the white balance adjustment of the color information in that region is decreased. On the other hand, as to components of shift in the direction along the light source color temperature axis L1, the amount of decrease in the weighting amount resulting from the shift amount is moderate as compared to the amount of the decrease in the above-mentioned orthogonal direction.

That is to say, the first condition of Rule 1 is expressed as an expression;

$r_{ij} + b_{ij} = K1$; K1 is considerably close to 0.

Accordingly, if K1 (y-intercept) is a value $\pm a$ (a is a positive value) very close to 0, the membership value indicating the degree to which the first condition is satisfied is produced in the range surrounded by the straight lines L2 and L3 of FIG. 10. The degree at which the first condition is satisfied increases as the lines L2 and L3 get closer to the straight line L1. That is to say, as shown in FIG. 6(a), the first condition is set so that a weighting amount of a particular region rapidly increases only when "a" gets closer to 0, that is, only when the lines L2 and L3 get considerably closer to the line L1 passing through the origin O.

Furthermore, the second condition of Rule 1 can be expressed as follows:

$r_{ij} - b_{ij} = K2$: K2 is close to 0.

Accordingly, if K2 (y-intercept) is a value $\pm c$ (c is a positive value) close to 0, a membership value indicating a degree to which the second condition is satisfied is produced in the range surrounded by the straight lines L4 and L5 of FIG. 11, and the degree to which the second condition is satisfied increases as the straight lines L4 and L5 get closer to the origin 0. That is, the second condition is set so that, as "c" approaches 0, that is, as the straight lines L4 and L5 get closer to the origin 0 side, the weighting amount gradually increases as shown in FIG. 6(b).

In accordance with the membership function of FIG. 6(b), the membership value becomes 0 only when c is extremely large. That is, in accordance with the second condition, if a color evaluating value of the region is at the origin O, the weighting amount of that region attains its maximum. Even when the color evaluating value is shifted from the origin O, however, if the shift is along the light source color temperature axis, mainly in the red direction or the blue direction, and is small in the direction orthogonal to the light source color temperature axis L1 (in the direction with extremely high chroma), the weighting amount of that region is increased to increase the contribution degree of that region to the picture evaluating for white balance adjustment.

Next, the first condition of Rule 2 can be expressed as:

$r_{ij} + b_{ij} = K3$, K3 is negative to a small extent.

If K3 (y-intercept) is a somewhat negative value $-d$ (d is a positive value), a membership value indicating a degree of satisfying the first condition is produced in the range surrounded by the straight lines L1 and L6 of FIG. 11.

Since the second condition is the same as the second condition of the above-mentioned Rule 1, a membership value indicating the degree of satisfaction is produced in the range surrounded by the straight lines L4 and L5 of FIG. 11.

Therefore, in accordance with Rule 2, as $-d$ gets nearer to a value of $r_{ij} + b_{ij}$ corresponding to a vertex of the mountain-like shown in FIG. 7(a), the weighting amount of that region is increased. Additionally, as c gets nearer to 0, that is as the straight lines L4 and L5 get nearer to the origin 0 side, the weighting amount is gradually increased as shown in FIG. 7(b). Thus, when the color in that region is shifted a small extent in the green direction (the direction along the line shown by $r_{ij} - b_{ij} = 0$ in the third quadrant of FIG. 11) the decrease in the weighting amount is moderated somewhat. The situation arise when a light is emitted from a light source inclining to green and away from the color temperature axis, such as a fluorescent light.

Next, in accordance with Rule 3, when the luminance of an object is extremely high, the color balance is broken due to saturation of the image sensing device causing irregularity toward a particular color in the picture, so that the weighting amount in such a region is decreased in order to reduce the contribution of the particular color of the white balance adjustment.

In weighting determining circuit 27, upon input of evaluating values $r_{ij}$, $b_{ij}$ and $y_{ij}$, inference is made according to the above mentioned respective rules, and a weighting amount $w_{ij}$ for each region is determined as a value in the range of 0–1.

On the other hand, color evaluating values $r_{ij}$ and $b_{ij}$ in each region are also inputted to a picture evaluating circuit 28. The picture evaluating circuit 28 calculates color evaluating values for the entirety of the picture. These color difference signals R-Y and BY are known as picture color evaluating values Vr and Vb, respectively. UR and UB are determined using the following expressions (1) and (2) on the basis of the weighting amount $w_{ij}$ for each region determined by the weighting determining circuit 27.

$$Vr = \sum_{i=j}^{8} \sum_{j=1}^{8} (r_{ij} \times w_{ij}) / \sum_{i=1}^{8} \sum_{j=1}^{8} w_{ij} \quad (1)$$

$$Vb = \sum_{i=j}^{8} \sum_{j=1}^{8} (b_{ij} \times w_{ij}) / \sum_{i=1}^{8} \sum_{j=1}^{8} w_{ij} \quad (2)$$

Gain control circuits 29 and 30 control gains of R amplifying circuit 4 and B amplifying circuit 5, respectively, so that both of picture color evaluating values Vr and Vb (which are color evaluating values for the entirety of the picture) become 0. In this way, when both of the picture color evaluating values Vr and Vb become 0, the white balance adjustment for the entirety of the picture is completed.

In the above-described first embodiment, it is configured, in order to share A/D converter 22 and integrator 23, by employing a selecting circuit 21. Circuit 21 selects any of three signal levels of a luminance signal Y, color difference signals R-Y and B-Y for each 1 field, although the updating cycle of a evaluating value of each signal component was 3 fields. Alternatively, an A/D converter and an integrator are provided for each of a luminance signal and color difference signals. Consequently, each evaluating value can be updated for each field, resulting in white balance adjustment with higher accuracy.

Furthermore, it is needless to say that the operations of weighting determining circuit 27 and picture evaluating circuit 28 of FIG. 3 can be implemented in a software manner using a microcomputer.

As described above, according to the first embodiment of the preset invention, by making fuzzy interference on the basis of previously set rules 1 through 3, color information representative of the entirety of the screen is determined for performing white balance adjustment. By this, stable white balance adjustment can be achieved without detailed condition setting for white balance adjustment corresponding to various picture taking conditions.

Next, FIG. 12 is a block diagram showing a white balance adjusting apparatus in accordance with the second embodiment of the present invention. In FIG. 12, a light from an object (not shown) is incident on image sensing device 2, formed of CCD, through a lens 1. The incident light is photoelectrically converted into an electric signal by image sensing device 2 to be provided to color separating circuit 3. Subsequently, color separating circuit 3 extracts three primary color signals of R, G and B from the electric signal. The extracted G signal is directly provided to camera processing and matrix circuit 6, and R and B signals are provided thereto through R amplifying circuit 4 and B amplifying circuit 5 with variable gains, respectively. The camera processing and matrix circuit 6, on the basis of the inputted three primary color signals of G, R and B, produces a luminance signal Y and color difference signals R-Y and B-Y and provides them to video circuit 7. The video circuit 7 applies well-known processes to these signals Y, R-Y and B-Y to produce a video signal for recording and provides the signal to a recording circuit not shown.

Simultaneously, two color difference signals R-Y and B-Y are provided to integrating circuits 38 and 37, respectively. On the other hand, high frequency component YH of the luminance signal Y is extracted by a high-pass filter (HPF) 8 and given to integrating circuit 39. The high frequency component YH has a characteristic that it increases in magnitude as the contrast of the image sensed picture increases. This characteristic can also be utilized for evaluating an in-focus state in automatic focusing operation of the TTL system.

Figure 13:
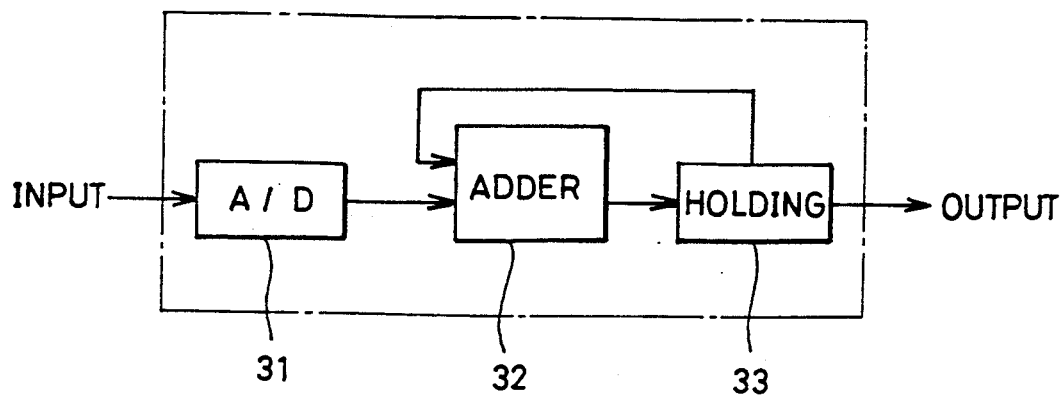
FIG. 13 is a block diagram showing details of the integrator of FIG. 12.

Each of integrating circuits 37, 38 and 39 is a digital-integrating circuit for integrating the input signal over one field period to output the same. The integrator has the configuration shown in FIG. 13. That is to say, referring to FIG. 13, each integrating circuit includes an A/D converter 31 for sampling the input signal in a predetermined sampling cycle for sequentially converting it into digital values, an adder 32 for adding an output of the A/D converter 31 and an output of a holding circuit 33 at the succeeding stage every time this A/D converter 31 provides an output, and a holding circuit 33 for holding the latest output of the adder 32. The the content held in holding circuit 33 is outputted as each kind of evaluating value for each single field. Thereafter holding circuit 33 is reset. In this way, each integrating circuit repeats the above-mentioned digital-integrating operation for each single field.

As a result, integrated values for 1 field of color difference signals B-Y and R-Y are supplied for 1 field as color evaluating values b and r from integrating circuits 37 and 38, respectively. Simultaneously, an integrated value for 1 field of a high frequency component YH of a luminance signal is supplied for each single field as a contrast evaluating value yh from integrating circuit 39.

Figure 1:
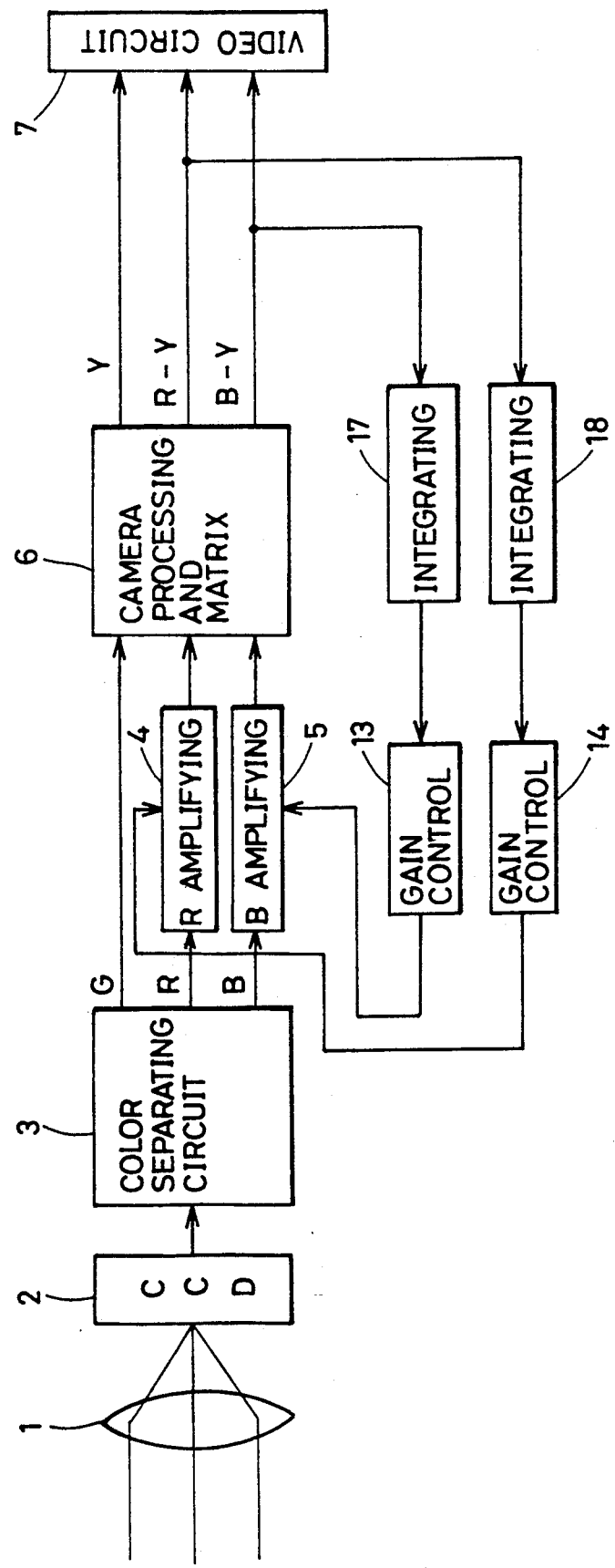
FIG. 1 is a block diagram showing one example of a conventional white balance adjusting apparatus.

A reference level, or 0 level of each of the color difference signals B-Y, R-Y inputted to integrating circuits 37 and 38 is set in advance at a level obtained when image-sensing a completely achromatic color surface. Accordingly, each of evaluating values obtained by digitally integrates these color difference signals may take not only a positive value but also a negative value. Color evaluating values b and r obtained as described above are respectively supplied to gain control circuits 43 and 44 and also applied to a phase difference detecting circuit 40, and the contrast evaluating value yh is supplied to time constant calculating circuit 41. Gain control circuits 43 and 44, similarly to gain control circuits 13 and 14 of FIG. 1, control variable gains of B amplifying circuit 5 and R amplifying circuit 4 so that these color evaluating values b and r attain 0, respectively.

That is to say, gain control circuit 43 controls the gain of B amplifying circuit 5 so that the larger the color evaluating value b is the smaller the amplifying gain of B amplifying circuit 5 becomes, and on the contrary, controls the gain of B amplifying circuit 5 so that the smaller the color evaluating value b is, the larger the amplification gain of B amplifying circuit 5 becomes. Gain control circuit 44 also controls a gain of R amplifying circuit 4 so that the larger the color evaluating value r is, the smaller the amplification gain of R amplifying circuit 4 becomes, and on the contrary, controls the gain of R amplifying circuit 4 so that the smaller the color evaluating value r, is the larger the amplification gain of R amplifying circuit 4 becomes.

Time constants of the gain variation of respective R and B amplifiers 4 and 5 are calculated by a time constant calculating circuit 41 which will be described later.

Phase difference detecting circuit 40 detects the shift of both of color evaluating values r and b from a pre-set light source color temperature axis for each field as phase difference.

Figure 14:
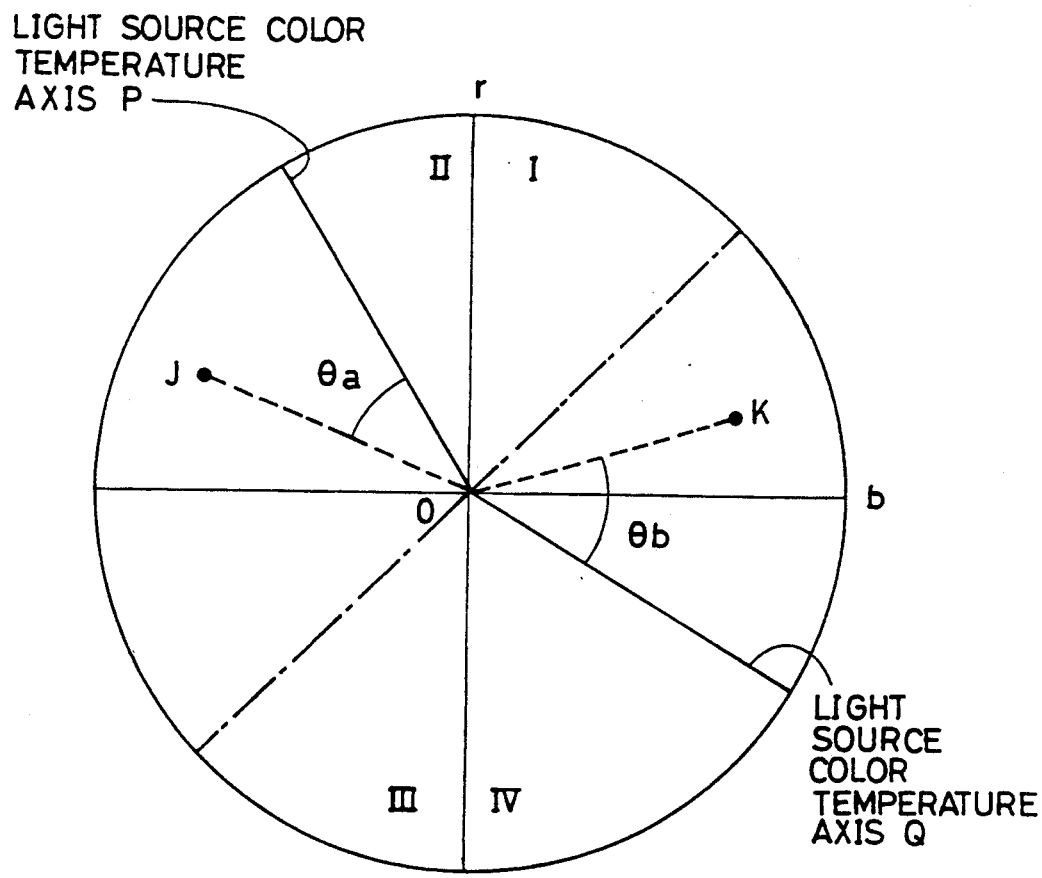
FIG. 14 is a diagram schematically showing phase difference between a light source color temperature axis and color difference signals.

FIG. 14, similarly to the above-described FIG. 2, shows a light source color temperature axis indicating how the two color evaluating values r and b change, which are obtained when a light source light irradiates a white object or an object including respective colors on average, as the color temperature of the light source changes. The light source color temperature axis is shown as the locus P in the second quadrant and the locus Q in the fourth quadrant on a color plane in which a color evaluating value r is indicated on the ordinate and a color evaluating value b is indicated on the abscissa.

The shift of each evaluating values r and b of the image sensed picture from the light source color temperature axis can be defined as an angle formed by a line connecting a point obtained by plotting color evaluating values on the color plane of FIG. 14 and the origin O and the light source color temperature axis. When $r \geq b$, however, the shift is obtained as an angle formed by the above line and a light source color temperature axis P existing in the second quadrant. In contrast when $r < b$, the shift is obtained as an angle formed by the above line and a light source color temperature axis Q existing in the fourth quadrant.

For example, if color evaluating values r and b calculated in a certain field exist at point J of FIG. 14, the phase difference $\theta$ is defined as angle $\theta_a$ between a line connecting the point J and the origin O and the light source color temperature axis P. If color evaluating values r and b exist at point K, the phase difference $\theta$ is defined as angle $\theta_b$ between a line connecting the point K and the origin O and the light source color temperature axis Q. The phase difference $\theta$ calculated in this way by the phase difference detecting circuit 40 is provided to time constant calculating circuit 41 together with contrast evaluating value yh from integrating circuit 34. Time constant calculating circuit 41, on the basis of the phase difference $\theta$ and the contrast evaluating value yn, determines the rate of fluctuation of gains of R and B amplifying circuits 4 and 5, or time constants of gain control. In the time constant calculating process by the time constant calculating circuit 41, fuzzy inference employing the following rules are introduced.

Rule 4

"If $\theta$ is large, then a time constant is made large"

Rule 5

"If yh is large, then a time constant is made small"

In these rules, as shown in FIGS. 15 and 16, conditions and conclusions such as "large", "small" are defined by a membership function for an input variable of "$\theta$", "yh" and an output variable of "time constant g".

Next, the above-described rules will be described.

Figure 15A:
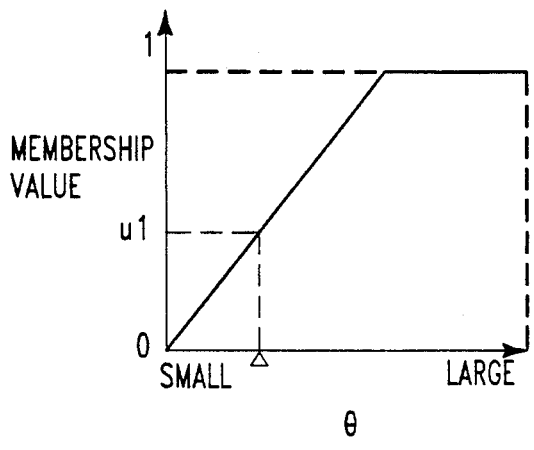
FIGS. 15(a)-15(b) graphs showing a membership function of the rule 4 of the second embodiment of the present invention.

Rule 4 is defined by membership functions shown in FIGS. 15(a) and (b). FIG. 15(a) is a graph for obtaining a membership value indicating a degree to which the condition of rule 1 of "$\theta$ is large" is satisfied, which indicates a membership function for phase difference $\theta$ as an input variable. The membership function shown in FIG. 15(a) is a function including a simple increasing straight line which increases as the phase difference $\theta$ increases, and a membership value u1 is obtained by substituting phase difference $\theta$ into the function.

Figure 15B:
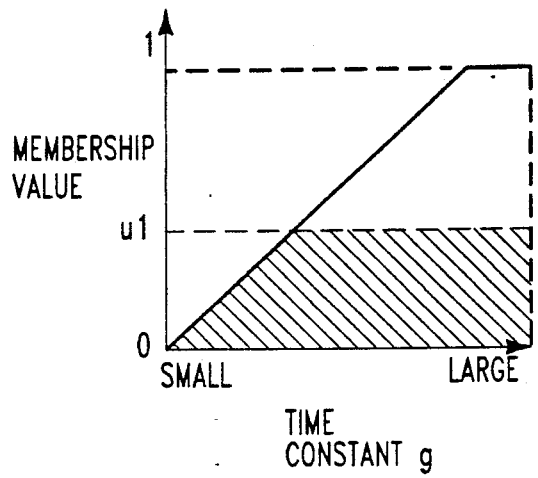

FIG. 15(b) is a graph showing a conclusion of "a time constant is made large", which indicates a membership function for a time constant as an output variable of rule 4. The membership function shown in FIG. 15(b) is a function including a simple increasing straight line, in which a membership value u1 of a condition of rule 4 is specified on the ordinate indicating membership value. The region indicated by the membership function of FIG. 15(b) is divided into two regions by the line corresponding to the specified membership value u1, and the region indicated by oblique lines which does not exceed the membership value corresponds to an inference result obtained by applying an actually calculated phase difference $\theta$ to rule 4.

For example, if the phase difference $\theta$ is a value indicated by $\Delta$ in FIG. 15(a), u1 is specified on the ordinate of FIG. 15(b). Then, with u1 as a boundary, as shown in FIG. 15(b), an upper poriton of the region designated by the membership function is deleted, and the remaining oblique line region corresponds to an inference result indicating the degree to which the rule 4 is satisfied.

Figure 16A:
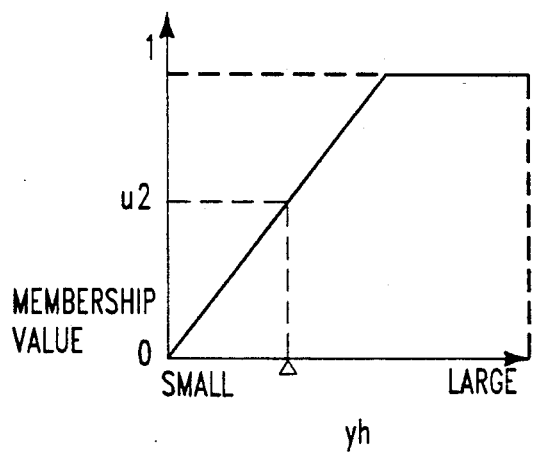
FIGS. 16(a)-16(b) graphs showing a membership function of the rule 5 of the second embodiment of the present invention.

Next, Rule 5 is defined by the membership functions shown in FIGS. 16(a) and (b). FIG. 16(a) is a graph for obtaining a membership value indicating a degree to which the condition of rule 5 "yh is large" is satisfied, which indicates a membership function for a contrast evaluating value yh as an input variable. The membership function shown in FIG. 16(a) is a function including a simple increasing straight line which increases as the contrast evaluating value yh increases, and a membership value u2 is obtained by substituting a contrast evaluating value yh into this function.

Figure 16B:
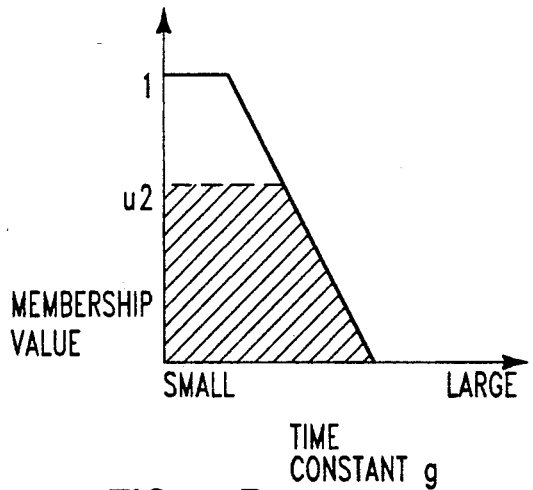

FIG. 16(b) is a graph showing a conclusion "a time constant is made small", which indicates a membership function for a time constant as an output variable of rule 5. The membership function shown in FIG. 16(b) is a function including a simple decreasing straight line, in which a membership value u2 of the condition of rule 5 is specified on the ordinate indicating membership value. The region designated by the membership function of FIG. 16(b) is divided into two regions by the line corresponding to the specified membership value u2, and a region designated by oblique lines which does not exceed the membership value corresponds to an inference result obtained by applying an actually calculated contrast evaluating value yh to rule 5.

For example, if a calculated contrast evaluating value yh is a value shown by $\Delta$ in FIG. 16(a), u2 is specified on the ordinate of 16(b). Then, with the u2 as a boundary, as shown in FIG. 16(b), an upper portion of the region designated by the membership function is deleted, and the remaining oblique line region corresponds to an inference result indicating the degree to which rule 5 is satisfied.

Figure 17:
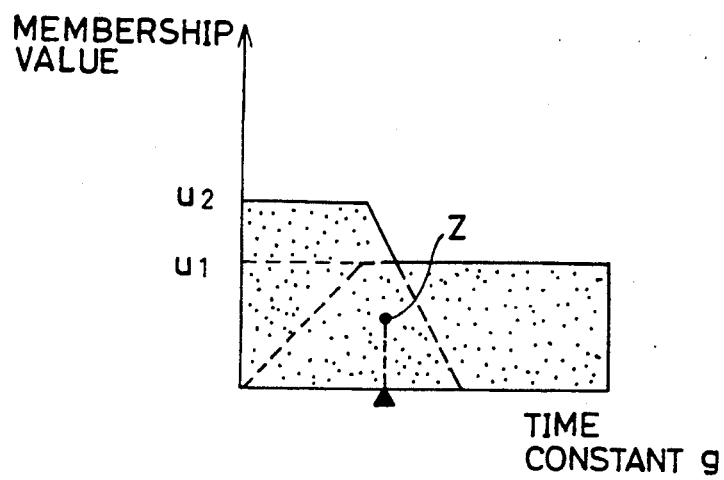
FIGS. 17 and 18 are graphs for describing operation principle of the second embodiment of the present invention.

Next, in consideration of both of the above described rules 4 and 5, a method of determining a time constant for gain control will be described. Respective quadrangles designated by oblique lines in FIGS. 15(b) and 16(b) are respectively superimposed on a coordinate system common to respective figures, that is, a coordinate system in which a time constant g is indicated on an abscissa and a membership value is indicated on the ordinate as shown in FIG. 17. The function of FIG. 17 corresponds to the membership function showing the final inference result. Then, a position in a horizontal direction of the center point Z of the region designated by the function corresponds to a time constant determined in consideration of all the conditions of rules 4 and 5. Instead of the above described method of determining a time constant according to a position of a center point, it is also possible to obtaining a position of an intersection point of a line parallel to the ordinate equally dividing the area of a portion surrounded by the membership value into left and right side portions and the abscissa, as a time constant.

Next, the effects of the above-described respective rules on the white balance adjusting operation will be described. As described above, in an image sensed picture which is mainly occupied by a white object or in an image sensed picture including respective colors on average, when the color temperature of the light source irradiating the object in the picture varies, color evaluating values r and b obtained by averaging color difference signals in the entirety of the picture vary along with the light source color temperature axis P and Q in FIG. 14. Accordingly, color evaluating values with its phase shifted from the light source color temperature axis or color difference signals do not reflect the color temperature of the light source almost at all, which are not preferably considered as basic information in white balance adjustment.

That is to say, color difference signals obtained from an image-sensed picture including much green and bluish violet are shifted in phase from the light source color temperature axis to a large extent, which seems not to be suitable to white balance adjustment. Accordingly, the larger the phase difference $\theta$ detected by phase difference detecting circuit 40, the more the effects upon white balance adjustment of those color evaluating values are required to be reduced.

Therefore, in the above-mentioned rule 4, a determination is made on the basis of the phase difference $\theta$ as to whether a lot of objects of green or bluish violet which have no connection with the color temperature variation of the light source itself exist in the picture or not. That is to say, as to the color evaluating values with large phase difference, since it is considered to be strongly affected by green and bluish violet objects existing in the picture, the degree of contribution of those color evaluating values for white balance adjustment is substantially reduced by making a time constant for controlling a gain of amplifying circuit 4 or 5 large.

On the other hand, in accordance with rule 5, in consideration of the fact that when there are many boundary portions among objects with objects of various colors existing in a mixed manner in an image sensed picture, the contrast evaluating value yh becomes larger, and on the contrary, when a monochromatic object occupies a large portion of the picture, a contrast evaluating value yh becomes small, a determination is made on the basis of a contrast evaluating value yh as to whether the image sensed picture includes respective colors on average or not. That is to say, when the contrast evaluating value yh is large, the image sensed picture includes various colors on average, which is suitable to white balance adjustment so that gain control circuits 43 and 44 are controlled so that a time constant of gain control is made small in order to immediately exert effects of the color evaluating values upon white balance adjustment.

Figure 18:
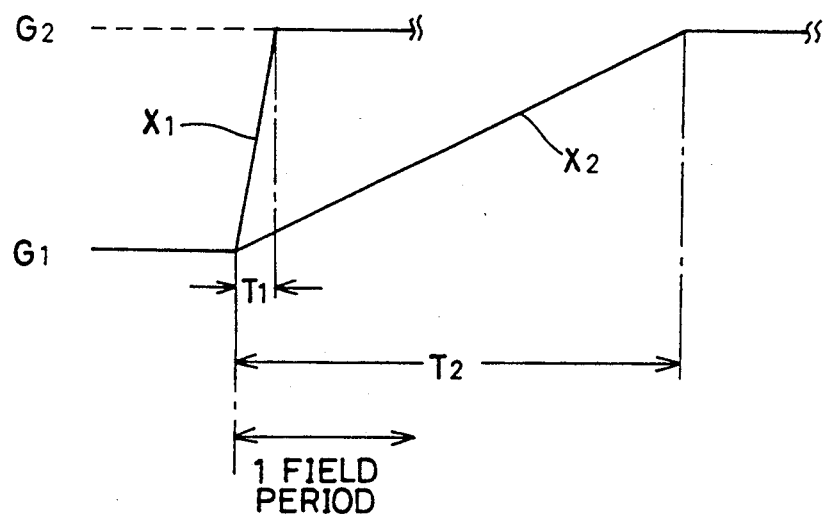

A signal specifying a time constant g calculated in this way is applied to gain control circuits 43 and 44, thereby time required for making respective color evaluating values calculated by integrated circuits 37 and 38 attain 0 is adjusted. That is to say, as shown in FIG. 18, considering the case where the amplification gain for a red color signal R of R amplifying circuit 4 in a certain image sensed picture is G1, when a necessity occurs to change the amplification gain to G2 in order to make zero a color evaluating value r calculated in the next field, the time required for changing amplification gain from G1 to G2 is directly proportional to time constant g. That is to say, when time constant g is small, for example, the gain variation ratio becomes larger as shown by the line X1 of FIG. 18, the gain varies rapidly, and the time required for the gain variation from G1 to G2 is as small as T1. Accordingly, R amplifying circuit 4 attaches great importance to the color evaluating value r newly calculated to vary the gain sensitively, the contribution degree to white balance adjustment of the color evaluating value r increases thereby.

On the other hand, when the time constant g is large, for example, the gain variation ratio becomes small as shown by the line X2 of FIG. 18, the gain changes moderately, and the time required for gain variation from G1 to G2 is T2 which is longer than 1 field period (1 horizontal scanning period, or 1/60 second). Accordingly, R amplifying circuit 4 does not sensitively change the gain in accordance with newly calculated color evaluating value r, accordingly, 1 field period passes before the gain reaches G2, and a gain on the basis of the color evaluating value for the next field is newly set. As a result, the gain of R amplifying circuit 4 does not reach G2, and the degree of contribution by the color evaluating value r in a field with a large time constant upon white balance adjustment is reduced thereby. Accordingly, even if an image-sensed picture inappropriate to white balance adjustment is temporarily produced, since a time constant in this period becomes larger, the effects by the picture upon white balance adjustment is reduced. Especially, when the time constant g is an extremely large value, it is regarded as an inappropriate picture as a base of white balance adjustment on the basis of evaluation of the picture, and the membership function may be set to substantially stop the variation of gain by setting a time constant g to infinity.

Figure 19:
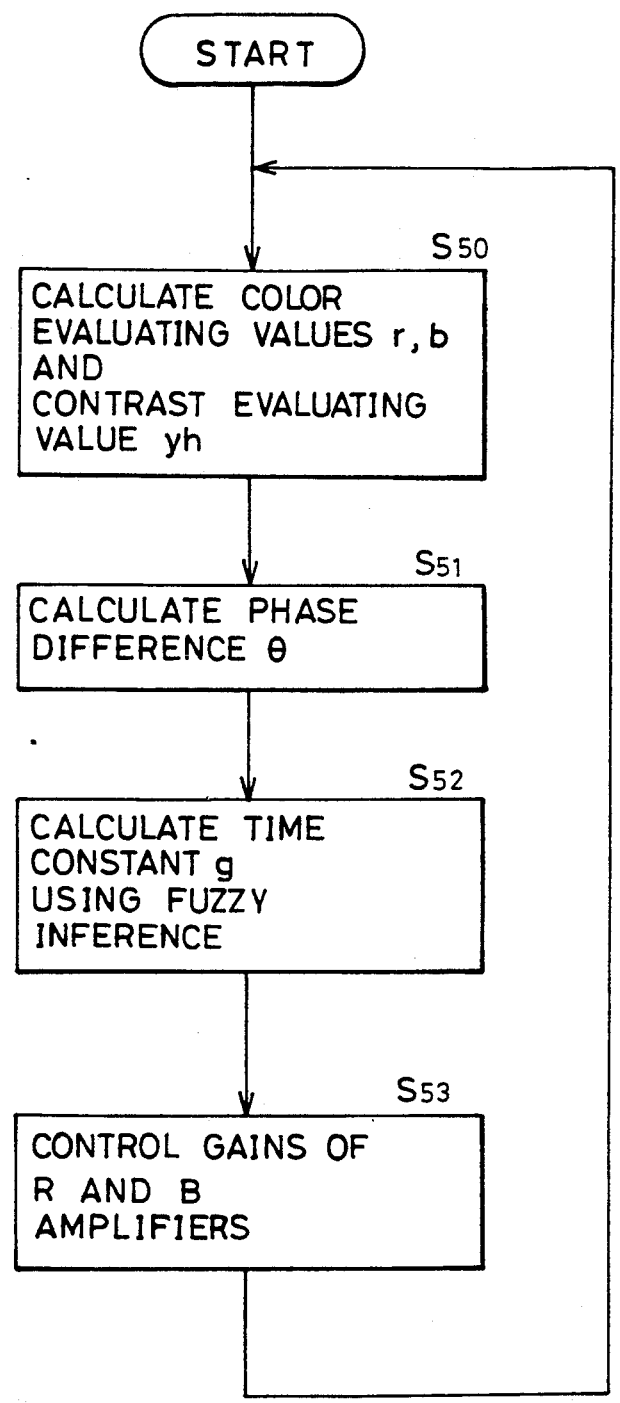
FIG. 19 is a flow chart for describing operation of the second embodiment of the present invention.

It is needless to say that the operation of each circuit described above can be processed in a software manner as shown in the flow chart of FIG. 19 employing a microcomputer. In FIG. 19, step S50 shows operation of integrating circuits 37, 38 and 39, step S51 shows operation of phase difference detecting circuit 40, step S52 shows operation of time constant calculating circuit 41, and step S53 shows operation of gain control circuits 43 and 44, wherein the series of these operations are carried out in 1 field cycle.

Here, color evaluating values r, b and a contrast evaluating value yh simultaneously used in phase difference detecting circuit 40, time constant calculating circuit 41 and gain control circuits 43 and 44 are all obtained from an image signal of the same field.

As described above, in accordance with the second embodiment of the present invention, by picture evaluation using fuzzy inference with input variables of phase difference $\theta$ and contrast evaluating value yh, a determination is made as to whether an image sensed picture is appropriate as an object of white balance adjustment or not, wherein as to an inappropriate picture, a time constant of amplification gain variation of each color signal on the basis of a color evaluating value obtained from the picture is increased in order to make it difficult to implement white balance adjustment by that color evaluating value. Accordingly, even when a picture with color tone inappropriate to white balance adjustment is taken, for example, in the case where colors in the entirety of the picture are not uniform because a monochromatic object occupies a large area on an image sensed picture, appropriate white balance adjustment can be made without setting detailed conditions corresponding to various image sensing conditions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A white balance adjusting apparatus for automatically adjusting white balance on the basis of a video signal obtained form image-sensing means (1, 2), comprising:
    amplifying means (4, 5) for amplifying a plurality of color information signals in said video signal with respective variable gains;
    means (24, 25) for dividing an image-sensed picture produce by said image sensing means so as to establish a plurality of regions on said image-sensed picture;
    means (21, 22, 23, 26) for converting respective levels of said plurality of color information signals for each of said plurality of regions into color evaluating values;
    weighting means (27) for weighting each color evaluating value with a corresponding weighting amount in each of said plurality of regions so as to generate a corresponding plurality of weighted color evaluating values;
    representative value determining means (28) for determining, in response to said plurality of weighted color evaluating values in said plurality of regions, representative values indicting color information for the entire image-sensed picture; and
    gain control means (29, 30) for controlling said variable gains of said amplifying means on the basis of said representative values;
    wherein the determination of said corresponding weighting amount is made through fuzzy inference using a plurality of rules with a value based on at least each color evaluating value in each of said plurality of regions as an input variable and with said corresponding weighting amount as a conclusion of said fuzzy inference.

2. The white balance adjusting apparatus according to claim 1, wherein the fuzzy inference for determining said weighting amount by said weighting means uses at least a sum and a difference of color evaluating values of red and blue in each of said plurality of regions as input variables.

3. The white balance adjusting apparatus according to claim 2, wherein the fuzzy inference for said weighting amount determination is made using a first rule that when a sum of color evaluating values of red and blue in each of said plurality of regions is considerably close to 0 and the difference therebetween is close to 0, the weighting amount is made large, and a second rule that when the sum of the color evaluating values of red and blue is negative to a small extent and the difference therebetween is close to 0, the weighting amount is made somewhat small.

4. The white balance adjusting apparatus according to claim 1, wherein the fuzzy inference for the weighting amount determination by said weighting means further employs a luminance signal level in each of said plurality of regions as an input variable.

5. The white balance adjusting apparatus according to claim 4, wherein the fuzzy inference for said weighting amount determination is made using a third rule that if the luminance signal level in each of said plurality of regions is considerably large, the weighting amount is made considerably small.

6. A white balance adjusting apparatus for automatically adjusting white balance on the basis of a video signal obtained form image-sensing means (1, 2), comprising:
    amplifying means (4, 5) for amplifying a plurality of color information signals in said video signal with respective variable gains;
    representative value determining means (37, 38) for determining representative values indicating color information for the entire image-sensed picture on the basis of said color information signals;
    gain control means (39, 40, 41, 43, 44) for controlling said variable gains of said amplifying means on the basis of said representative values; and
    wherein control of the gains associated with all of said color information signals by said gain control means is made through fuzzy inference using a plurality of rules.

7. The white balance adjusting apparatus according to claim 6, wherein the fuzzy inference for gain control by said gain control means uses phase difference between a predetermined light source color temperature axis and said color information signals as an input variable and a time constant of gain control by said gain control means as a conclusion portion.

8. The white balance adjusting apparatus according to claim 7, wherein the fuzzy inference for gain control by said gain control means is made using a fourth rule that if said phase difference is large, the time constant is made large.

9. The white balance adjusting apparatus according to claim 6, wherein the fuzzy inference for gain control by said gain control means uses a high frequency component level of a luminance signal in said video signal as an input variable and a time constant of gain control by said gain control means as a conclusion portion.

10. The white balance adjusting apparatus according to claim 9, wherein the fuzzy inference for gain control by said gain control means is made using a fifth rule that if said high frequency component level is large, the time constant is made small.

11. A white balance adjusting apparatus for automatically adjusting white balance on the basis of a video signal obtained from image-sensing means (1, 2), comprising:
    amplifying means (4, 5) for amplifying plurality of color information signals in said video signal with respective variable gain;
    gain control means (37, 38, 43, 44) for controlling said variable gains of said amplifying means on the basis of said color information signals;
    phase difference detecting means (40) for detecting phase difference between a predetermined light source color temperature axis and said color information signals; and
    means (41) for determining a time constant of the gain control by said gain control means in response to said detected phase difference.

12. The white balance adjusting apparatus according to claim 11, wherein the determination of the time constant by said time constant determining means is made using fuzzy inference.

13. A white balance adjusting apparatus for automatically adjusting white balance on the basis of a video signal obtained from image-sensing means (1, 2), comprising:

amplifying means (4, 5) for amplifying a plurality of color information signals in said video signal with respective variable gains;

gain control means (37, 38, 43, 44) for controlling said variable gains of said amplifying means on the basis of said color information signals;

contrast evaluating value detecting means (8, 39) for detecting a high frequency component level in the luminance signal in said video signal as a contrast evaluating value; and means (41) for determining a time constant of the gain control by said gain control means in response to said detected contrast evaluating value.

14. The white balance adjusting apparatus according to claim 13, wherein the determination of the time constant by said time constant determining means is made through fuzzy inference using said contrast evaluating value as an input variable and said time constant as a conclusion of said fuzzy inference.

15. A white balance adjusting apparatus for automatically adjusting white balance in response to a video signal obtained for image-sensing means (1, 2), comprising:

amplifying means (4, 5) for amplifying a plurality of color signals in said video signal with respective variable gains so as to yield a plurality of amplified color signals;

means (24, 25), responsive to said video signal, for dividing an image-sensed picture produced by said image sensing means so as to establish as plurlatiy of regions on said image-sensed picture;

means (6) for converting said plurality of amplified color signal into a plurality of color difference signals;

means (21, 22, 23, 26) for converting respective levels of said plurality of color difference signals for each of said plurality of regions into color evaluating values;

weighting means (27) for weighting each of said color evaluating values with a corresponding weighting amount for each of said plurality of regions so as to generate a corresponding plurality of weighted color evaluating values;

representative value determining means (28) for determining, in response to said plurality of weighted color evaluating values in said plurality of regions, representative values indicating color information for the entire image-sensed picture; and gain control means (29, 30) for controlling said variable gains of said amplifying means on the basis of said representative values;

wherein the determination of said corresponding weighting amount is made through fuzzy inference using a plurality of rules with a value based on at least each color evaluating value in each of said plurlatiy of regions as an input variable and with said corresponding weighting amount as a conclusion of said fuzzy inference.

* * * * *